Figure 1:
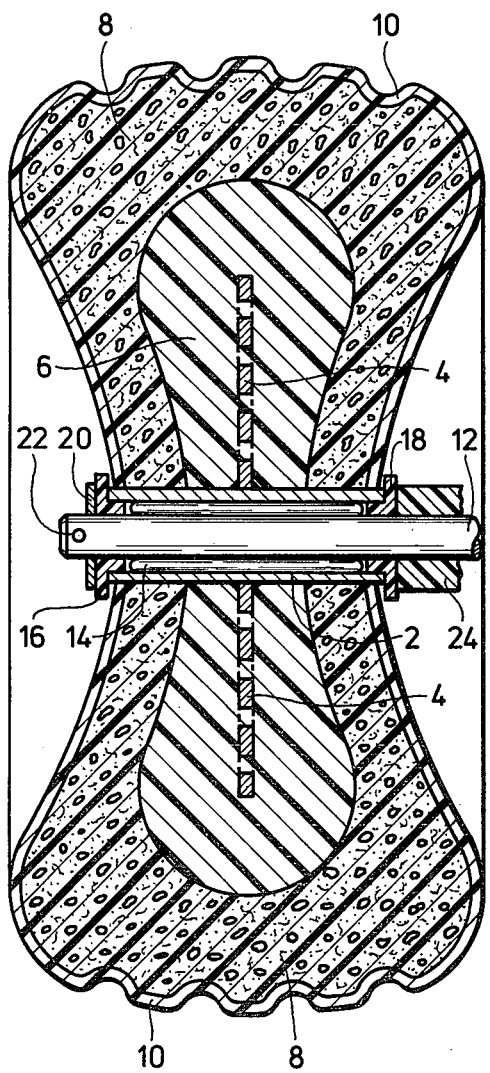

United States Patent [19]

Funke

[11] 3,987,832

[45] Oct. 26, 1976

[54] SOLID WHEEL REINFORCED

[75] Inventor: Peter Funke, Munich, Germany

[73] Assignee: ISPOW AG, Chur, Switzerland

[22] Filed: Oct. 10, 1974

[21] Appl. No.: 513,839

[30] Foreign Application Priority Data

Oct. 17, 1973 Germany............................ 2352158

[52] U.S. Cl. ................................. 152/310; 152/323
[51] Int. Cl.[2] ............................................ B60C 7/22
[58] Field of Search ........................... 152/310–315, 152/323, 324, 327, 329, 346, 347; 301/63 PW

[56] References Cited

UNITED STATES PATENTS

| 642,838 | 2/1900 | Cochrane | 152/347 |
| 819,036 | 5/1906 | Ashley | 152/311 |
| 1,276,148 | 8/1918 | Williams | 152/311 X |
| 1,474,387 | 11/1923 | Schoneberger | 152/313 X |
| 2,550,773 | 5/1951 | Christensen et al. | 152/346 |
| 2,592,164 | 4/1952 | Maxam | 301/63 PW |
| 2,730,222 | 1/1956 | Klein | 301/63 PW |
| 3,100,518 | 8/1963 | Dresser | 152/347 |
| 3,348,597 | 10/1967 | Goldberg et al. | 152/323 |
| 3,857,427 | 12/1974 | Soucek | 152/347 |

FOREIGN PATENTS OR APPLICATIONS

| 36,824 | 4/1909 | Austria | 152/310 |
| 864,699 | 1/1941 | France | |
| 1,117,429 | 11/1961 | Germany | |
| 379,577 | 9/1932 | United Kingdom | |

*Primary Examiner*—Allen N. Knowles
*Assistant Examiner*—Norman L. Stack, Jr.
*Attorney, Agent, or Firm*—Hans Berman

[57] ABSTRACT

This invention relates to a wheel comprising a hard radially extending core enclosing a hub sleeve, and a soft casing enclosing the core around its circumference and its flanks up to the hub sleeve.

5 Claims, 2 Drawing Figures

U.S. Patent    Oct. 26, 1976    3,987,832

SOLID WHEEL REINFORCED

This invention relates to a wheel which can be used e.g. for motor-driven lawn mowers and small vehicles. Wheels of this type are generally manufactured from steel, sheet metal or plastic rims, and from a solid-rubber tire or also a tire using a tube or a tubeless pneumatic tire or a solid plastic tire.

The object of the invention is to provide a wheel which is simple and economical to manufacture. Said wheel is resilient without air pressure, protects the underground and is practically maintenance-free like a solid-rubber tire.

To accomplish this object, the wheel is characterized by a hard radially extending core enclosing a hub sleeve, and by a soft casing enclosing the core around its circumference and its radial side faces up to the hub sleeve. Basically, the core can be made from metal, wood or plastic and the casing can be made from a flexible plastic foam.

Preferably, the hard core consists of a perforated disk mounted on the hub, said disk being enclosed by solid plastic foam or by a sheet metal cover which is mounted on the hub.

The soft casing is preferably made from a soft plastic foam, in particular polyurethane foam, which is covered by a skin which has almost no pores.

Generally, the core can be hollow as it is the case with the sheet metal cover. A bearing can be provided in the hub of the wheel.

Two embodiments of the invention are illustrated in the drawings, wherein

Figure 2:
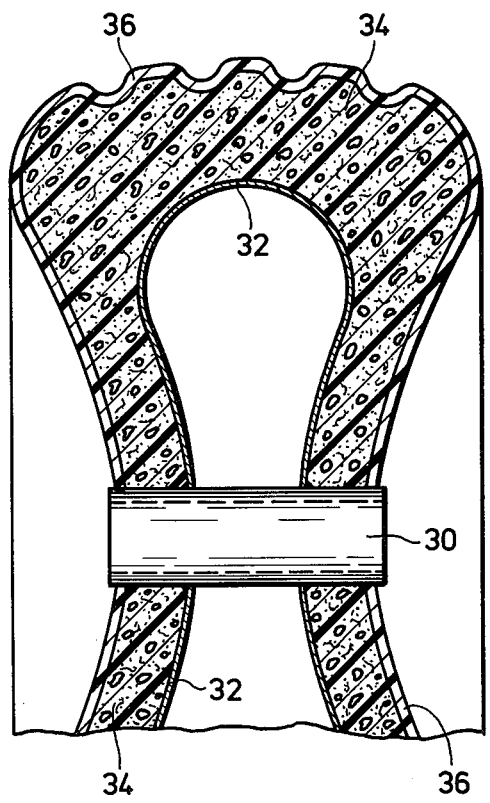

FIG. 1 shows an embodiment with a solid core; and
FIG. 2 an embodiment with a hollow core.

In the embodiment according to FIG. 1 a perforated disk 4 manufactured from metal or plastic is positioned on a hub sleeve 2 which can be made from metal or plastic as well. The embodiment illustrated in the drawings shows welded metal parts.

The perforated disk 4 is enclosed from all sides up to said hub sleeve 2 with hard polyurethane plastic foam, forming the core 6 and partly received in the perforations of the disc. All sides of this core 6 are enclosed up to the axially projecting end portions of the hub sleeve 2 by a jacket or casing 8 of soft polyurethane plastic foam, which, due to its manufacturing process, is covered with a leatherlike skin 10 having almost no pores.

Said hub sleeve 2 is coaxially mounted on a shaft 12. A needle bearing 14 is provided between said shaft 12 and said hub sleeve 2. Said hub sleeve 2 is sealed to the shaft 12 by means of plastic stoppers 16 and 18. The outer side of said plastic stopper 16 supports a disk 20 which is secured by means of a split 22 penetrating said shaft 12. The inner end of said shaft 12 is seated in a resilient polyamide cylinder 24.

For the manufacture of the wheel according to FIG. 1, said hub sleeve is positioned together with said perforated disk 4 and said hard core 6 in a mold whose remaining hollow space has the shape of said jacket 8. This remaining space is then foamed with soft polyurethane thus forming a unitary casing consisting of the jacket 8 and the uniformly thin skin 10. The hardness of the polyurethane foam from which said jacket 8 is manufactured, is selectable.

The embodiment according to FIG. 2 shows a hollow core 32 made from sheet metal and being positioned on a hub sleeve 30. Said hollow core 32 is enclosed up to said hub sleeve 30 by a casing 34 made from polyurethane foam, as is shown in the embodiment according to FIG. 1. The casing 34 is covered with a leatherlike coating 36 made from polyurethane and having almost no pores.

What is claimed is:
1. A wheel comprising:
 a. a hub member defining an axis of rotation;
 b. a core mounted on said hub member,
  1. said core having two side faces radially extending outward from said hub member and an outer circumferential face connecting said side faces,
  2. respective axial end portions of said hub member axially projecting from said side faces; and
 c. a unitary casing consisting essentially of plastic and engaging said end portions,
  1. said casing having a jacket portion enveloping said core, respective parts of said jacket portion engaging said faces of said core, and a leatherlike skin portion axially and radially covering said parts of said jacket portion,
  2. said jacket portion consisting of said plastic in foamed, porous condition,
  3. said plastic in said skin portion being less porous than in said jacket portion and being separated from said faces of said core by said parts of said jacket portion respectively.
2. A wheel as set forth in claim 1, wherein said core essentially consists of a hollow metal body.
3. A wheel as set forth in claim 2, wherein said skin portion is thinner than said jacket portion and of substantially uniform thickness.
4. A wheel comprising:
 a. a hub member defining an axis of rotation;
 b. a core including a radial metal disc mounted on said hub member and formed with axial openings therethrough, and a body of plastic foam enveloping said metal disc, respective portions of said body being received in said openings,
  1. said body having two side faces radially extending outward from said hub member and an outer circumferential face connecting said side faces,
  2. respective axial end portions of said hub member axially projecting from said side faces; and
 c. a unitary casing consisting essentially of plastic and engaging said end portions,
  1. said casing having a jacket portion enveloping said core, respective parts of said jacket portion engaging said faces of said body, and a leatherlike skin portion axially and radially covering said parts of said jacket portion,
  2. said jacket portion consisting of said plastic in foamed porous condition,
  3. said skin portion being less porous than said jacket portion and being separated from said faces of said body by said parts of said jacket portion respectively,
  4. the plastic foam of said body being harder than the foamed plastic of said jacket portion.
5. A wheel as set forth in claim 4, wherein said hub member is tubular.

* * * * *